June 11, 1957 — R. J. COVERT — 2,795,007
UNIVERSAL VULCANIZER
Filed May 3, 1955 — 3 Sheets-Sheet 1

INVENTOR
Robert J. Covert
BY Herbert A. Weinturn,
ATTORNEY

June 11, 1957     R. J. COVERT     2,795,007
UNIVERSAL VULCANIZER

Filed May 3, 1955     3 Sheets-Sheet 3

INVENTOR
Robert J. Covert
By Herbert A. Minturn
ATTORNEY ns # United States Patent Office 2,795,007
Patented June 11, 1957

2,795,007
UNIVERSAL VULCANIZER

Robert J. Covert, Indianapolis, Ind., assignor to Bowes Seal Fast Corporation, Indianapolis, Ind., a corporation of Indiana Application May 3, 1955, Serial No. 505,736

1 Claim. (Cl. 18—18)

This application is a continuation in part of my application for U. S. Letters Patent Serial No. 441,119, filed July 2, 1954.

This invention relates to an electrical heated vulcanizer to be used for vulcanizing patches on rubber goods including tubeless tires. A primary object of the invention is to provide a structure which may be portable and in which structure, an electrical heating element may be applied selectively to the inside or the outside of a tire depending somewhat upon the position of the repair to be made.

A further important object of the invention is to provide a structure which is exceedingly efficient in current consumption and also is quite compact in size for easy manipulation. In addition, the invention provides for a very even heat control over the zone of the repair to be made.

A still further important object of the invention is to provide a structure which will be quite durable even under the rough usage such a device ordinarily experiences in a tire repair shop, garage, or filling station.

A still further important object of the invention is to provide for an interchangeable mounting of a base supporting a mandrel and the heating unit itself.

All of these objects are combined in the structure of the invention, which structure is quite "foolproof" in nature.

These and many other objects and advantages of the invention will become apparent to those versed in the art in the following description as illustrated by the accompanying drawings, in which.

Figure 1:
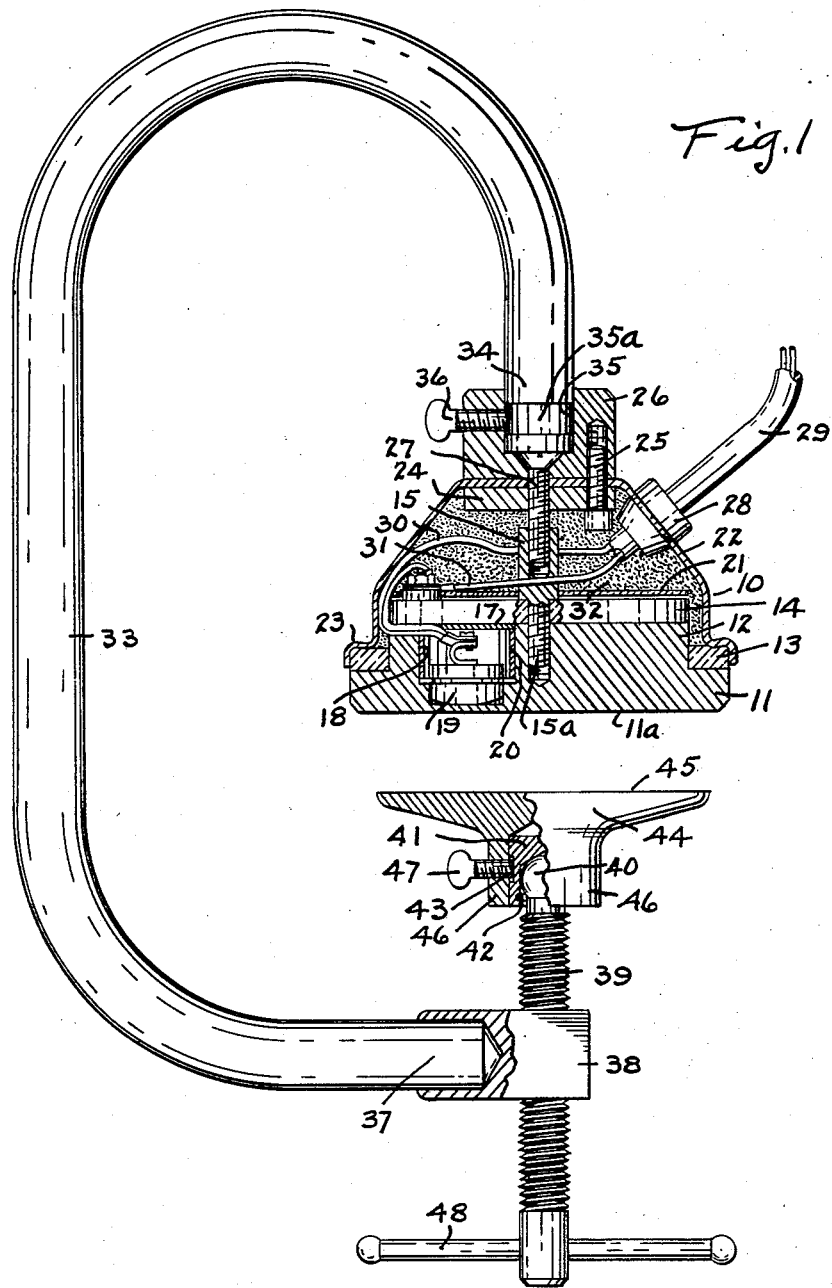
Fig. 1 is a view in side elevation and partial section of a structure embodying the invention.

A heating unit generally designated by the numeral 10 has a heat transfer plate 11 of relatively considerable thickness and is generally cylindrical in shape having a flat under face 11a.

The plate 11 has a reduced diameter portion 12 around which is placed an insulating gasket 13. A circular heating element 14 of an electrical resistance type, the details of construction not forming a part of the invention per se and hence not shown, is positioned on top of the plate 11 over the portion 12, and is held snugly thereagainst by means of a hollow tube 15 having a lower screw-threaded stem 15a passing through the heat element 14 and screw-threadedly engaging centrally in the plate 11.

To one side of the stem 15a, the plate 11 is provided with a bore 18 within which a thermostat element 19 is positioned and held in place by a cylindrical sleeve 20 bearing thereagainst by its lower end and by its upper end against an insulating disc 17 bearing against the heating element 14. A heat insulating and deflector plate 21 is placed over the top side of the heating element 14.

Surrounding the heating element 14 and its cover plate 21, is an enclosing cover in the nature of a cup 22 which has a flange 23 bearing on the gasket 13 and extending down around its outer side. A washer 24 is carried on the inside of the cup 22 and secured in position by any suitable means, herein shown as by means of a screw 25 extending through a side portion of the washer 24, the cup 22 and screw-threadedly engaging a thimble 26 bearing against the cup 22. The thimble 26 is provided with a central bore as is also the washer 24, and a securing screw 27 revolubly passes down through the thimble 26, cup 22, and washer 24 to screw-threadedly engage in the tubular member 15 whereby the cup 22 is compressibly urged against the washer or gasket 13. In this manner, a compresive fit of the plate 11 against the gasket 13 is secured.

A grommet 28 of insulating qualities is fitted into a side of the cup 22, and a cable 29 is led through the grommet 28 to have its wires 30 and 31 connected in series with the heating element 14 and the thermostat 19. The space within the cup 22 and above the deflector 21 and around the edge of the heating unit 14 is preferably filled with a loose granular or comminuted insulating material 32.

A frame member generally in the shape of the letter C and designated by the numeral 33 is provided with an end portion 34 which slidingly fits into the bore 35 of the thimble 26, axially of the plate 11. Since the unit 10 may be used in the position as indicated in Fig. 1, means must be provided to retain the unit mounted on the end 34. One particular means herein shown is that of an annular groove 35a around the end portion 34 spaced upwardly somewhat from the extreme end of the frame 33, and then a setscrew 36 herein shown as in the nature of a thumbscrew is screw-threadedly carried transversely of the thimble 26 to have its end come within the groove 35a.

The other end 37 of the frame member 33 extends at a distance from the end 34 and is directed to have its axis at right angles to the axis of the end portion 34. On this end 37, there is fixed a block 38 through which is carried screw-threadedly, a screw-threaded stem 39, the axis of which stem 39 coincides with the axis of the end portion 34 and also the axis through the plate 11.

The end of the stem 39 directed toward the end portion 34 preferably carries a ball end 40 on which is mounted a head 41 to swivel therearound, and be retained thereon in any suitable manner, such as by a retaining wire 42 below the ball 40. This head 41 has an external diameter the same as the diameter of the end portion 34 of the frame member 33, and likewise has an annular groove 43 therearound.

A base plate 44 having an upper flat face 45 is provided with a sleeve 46 which slidingly will fit over the head 41, and a thumbscrew 47 extending transversely of the sleeve 46 can be screw-threadedly carried by its inner end into the groove 43.

The structure thus far described may receive a rubber article between the plate face 11a and the base face 45 and the stem 39 advanced toward the plate 11 by any suitable means such as by the cross bar 48 in the outer end of the stem 39. Normally there would be a mandrel positioned on the plate 45 of a particular shape to conform to the shape of the article, such as the mandrel 50, Fig. 4, which is carried on the base 44 to fit inside of a tire 51.

Figure 2:
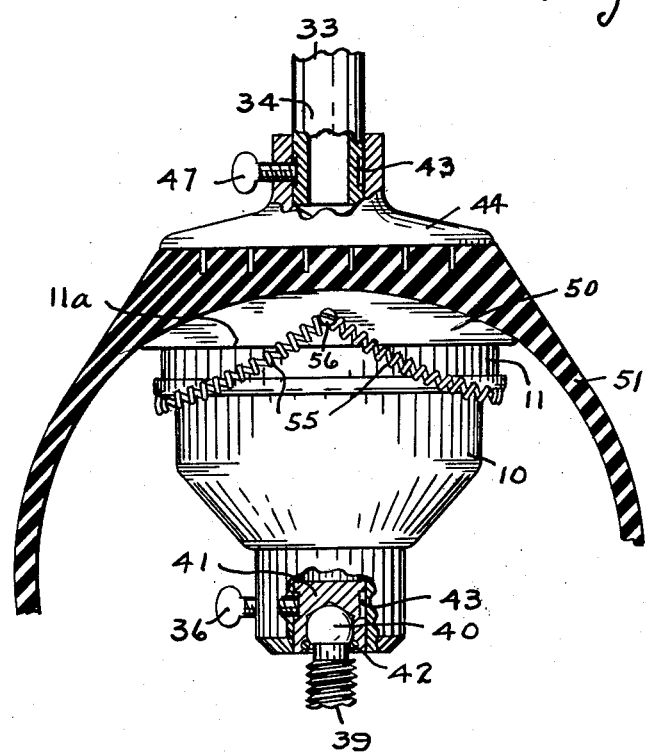
Fig. 2 is a view in detail showing the heating unit reversed in position from that shown in Fig. 1, the detail being shown in side elevation and partial section and as applied to a section of a tire.
Figure 3:
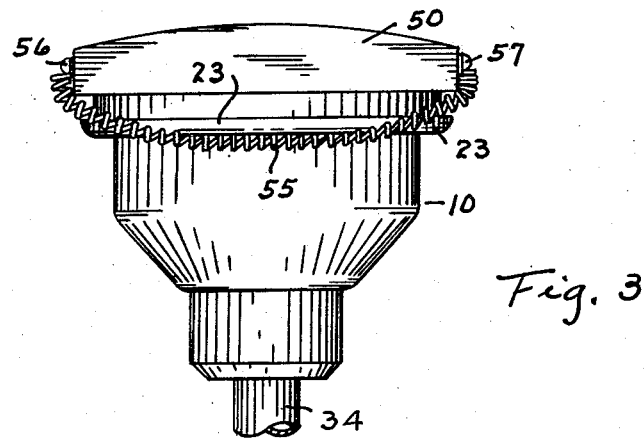
Fig. 3 is a detail in side elevation of the heating unit revolved 90 degrees from the position indicated in Fig. 2.

As indicated in Fig. 2, the heat unit 10 may be removed from the end 34 of the frame member 33 and positioned on the member 41 and likewise the base 44 may be positioned and carried on the end 34. In this case, the mandrel 50 is placed over the face 11a of the plate 11.

Figure 4:
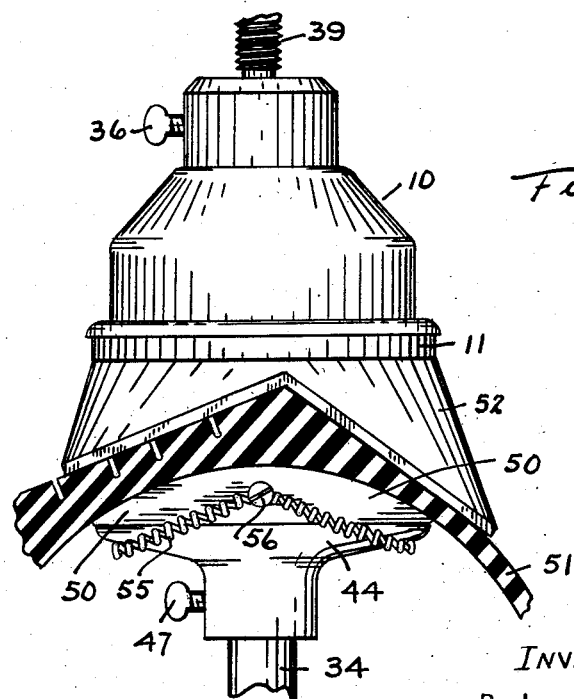
Fig. 4 is a view in side elevation of the heating unit and supporting base carrying a mandrel applied to the inside of a tire shown in section.

By making the mounting of the heat unit 10 and of the base member 44 interchangeable in respect to the frame 33, it is possible to position the heat unit 10 either inside of the tire 51 as indicated in Fig. 2, or outside thereof as indicated in Fig. 4.

Obviously, two of such units 10 may be employed, one on the end 34 and the other on the member 41 in opposition one with the other where an exceedingly thick section of rubber is encountered at the zone of repair.

Where a repair is to be made in the worst possible location as on the outside of a tire as indicated in Fig. 4 at the juncture of the tread with the side wall of the tire, a special mandrel 52 is employed, and due to the thickness of the rubber, it is advisable to apply the heat from the outside and the unit 10 will be on the outside bearing against the mandrel 52 with the mandrel 50 on the inside resting on the base 44. Other shapes of mandrels may be employed than those indicated depending upon the curvature of the tire at the repair zone, but since the particular shapes of these mandrels do not enter into the invention per se, other shapes are not herein set out.

When the mandrel is to be carried inside of the tire particularly, it is desirable that some quick and easy means may be employed to retain the mandrel on the heat element 10 or the base 44 whichever the case may be as indicated in Figs. 2 and 4, so that the mandrel 50 for example will be certain to remain in place upon the member 10 or 44, the mandrel 50 being in such position covered over within the tire and not readily observed.

A unique manner of locating and retaining the mandrel 50 in position in this situation is herein shown as consisting of a coil spring 55 secured to the mandrel 50 on opposite sides thereof by any suitable means, herein shown as by means of the screws 56 and 57. Normally this spring 55 lies closely against the margin of the mandrel 50, but it has sufficient flexibility to permit it to be pulled down and under the flange 23 where the mandrel 50 is applied to the heat unit 10, or when applied to the base 44 to be pulled down and under the base itself as indicated in Fig. 4. By employing the spring 55 in this manner, it securely retains the mandrel 50 in position in either case, and at the same time permits quick and easy release. Also no inner bores or holes are required to receive the spring in respect to its engagement with the member 10 or the member 44.

Therefore it is to be seen that I have provided a very simple, but most effective structure for the purposes intended, and a structure which is well protected against outside injury. Also there is provided a structure which may be readily handled and manipulated to make it applicable to any location around the tire. While reference has been made to a tire as being the object to be vulcanized, nevertheless other rubber goods as initially indicated may be vulcanized by this apparatus so that the invention is not limited to use on tires alone. Inner tubes, hot water bottles, overshoes, boots, and in fact any rubber article which may be carried between the heat unit and a mandrel carried by the frame 33 may be operated upon.

Therefore while I have shown my invention in the one particular form, obviously structural variations may be employed without departing from the spirit of the invention, and I therefore do not desire to be limited to that precise form beyond the limitations which may be imposed by the following claim.

I claim:

A vulcanizing structure comprising a pair of plates, one of which at least carries means for heating it; a pair of opposing members normally spaced apart, one advanceable toward the other, and each interchangeably and detachably receiving and retaining one of said plates; each of said plates having a face and a reduced diameter portion back of the face; mandrels each having a plate face contacting area, interchangeably carried by said plates selectively; and means removably retaining one of the mandrels on a plate face comprising a coil spring in two portions circumferentially ringing the mandrel and fixed thereto by ends of the portions at two common points around a mandrel, spaced apart one diametrically opposite the other and adjacent the said mandrel contacting area, one spring portion between the two said points being pulled on the one side of the mandrel into increasing tension and looped over the plate at said diameter, and the other spring portion being pulled into increasing tension and looped over the plate at said diameter on its other side, thereby tending under the influence of the diagonally positioned spring portions to center the mandrel on the plate and yieldingly retain it thereagainst.

References Cited in the file of this patent

UNITED STATES PATENTS

| 1,077,328 | Bowyer | Nov. 4, 1913 |
| 1,718,485 | O'Sullivan | June 25, 1929 |
| 1,966,772 | Thaheld | July 17, 1934 |
| 1,997,268 | Scharpf | Apr. 9, 1935 |

FOREIGN PATENTS

| 782,044 | France | Mar. 11, 1935 |